Patented Jan. 25, 1927.

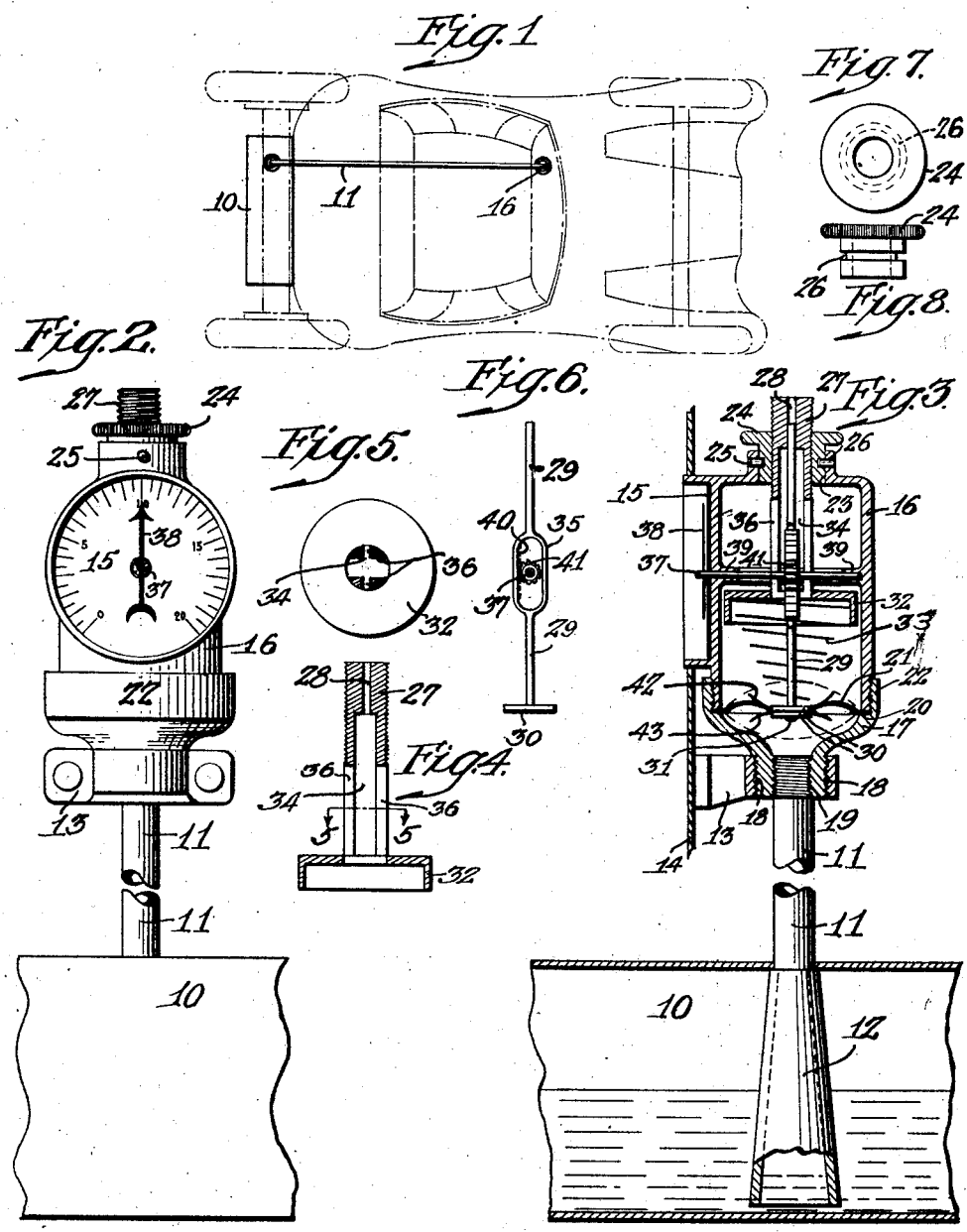

1,615,264

UNITED STATES PATENT OFFICE.

THOMAS M. EYNON, OF PHILADELPHIA, PENNSYLVANIA.

GASOLINE-PRESSURE GAUGE.

Application filed November 24, 1922. Serial No. 602,993.

My invention relates to indicators for automobile use intended to show the depth of gasoline in the tank.

The purpose of my invention is to apply the movement of a spring-retracted diaphragm directly to a gear upon an indicator spindle.

A further purpose is to make the zero setting of a spring-pressed diaphragm gauge adjustable by adjustment of the strength of the retracting spring.

A further purpose is to straddle the spindle of an indicator by an adjustable abutment for a diaphragm-retracting spring.

Further purposes will appear in the specification and in the claims.

I have preferred to illustrate my invention by one form only, selecting a form which is practical, efficient and inexpensive and which at the same time well illustrates the principles of my invention.

Figure 1 is a skeleton view of an automobile and to which my invention is applied.

Figure 2 is a side elevation of an indicator with a side elevation of a tank upon a different scale.

Figure 3 is a section of a structure similar to Figure 2 in position upon a dash-board.

Figure 4 is a vertical longitudinal section through one of the parts shown in Figure 3.

Figure 5 is a section of Figure 4 upon line 5—5.

Figure 6 is a fragmentary section of Figure 3 showing the diphragm stem or plunger and the shaft and gear moved by it.

Figures 7 and 8 are a top plan view and side elevation of an adjusting nut seen in Figure 3.

In the drawings similar numerals indicate like parts.

The automobile tank 10 is connected with the indicator by any pipe 11 ending in the tank in a terminal 12 extending down to approximately the bottom of the tank and in which air—and some gasoline vapor—are trapped by gasoline in the tank. The gasoline will rise within this tube and will displace the air in it, coming to rest at some point such that the increase of pressure within the pipe over the atmospheric pressure is equaled by the effective head between the level of the gasoline in the tank and the level of the gasoline in the terminal. In the form shown I have confined my illustration to the indicator and single connection, in order to bring out the principles there involved and without complication by provision for taking care of the barometric pressure variation nor by the vacuum or pressure in the tank, present in some tanks but absent in others.

I have shown the indicator as mounted by means of a bracket 13 upon dash-board 14 so that the dial 15 of the indicator shows through the dash. The dial is mounted upon the side of a casing divided into two main parts, a body 16 and a base 17, the bottom of which is screwed at 18 into the bracket. The pipe 11 is threaded at 19 into the bottom 17 of the casing.

The upper end of the base provides an interior seat 20 for the periphery of a diaphragm 21 and is flanged at 22 for threaded engagement with the body, so that the screwing of the body into the base is utilized to clamp the diaphragm in position.

The upper end of the casing is bored at 23 to receive a knurled nut 24 rotatable within the end of the casing and held from longitudinal movement by pins 25 fitting within the groove 26 of the nut.

The threads of the nut engage and longitudinally adjust the threaded member 27 which performs the two functions of forming a bearing at 28 for a plunger 29 screwed to the diaphragm by clamp plates 30 and screw 31, and of supporting a flanged abutment 32 for the spring 33 lying between this abutment and the diaphragm. The member 27 is hollow within the interior at 34 to give room for the yoke 35 of the plunger 29 and is slotted at 36 to give passage (relatively) to a transversely extending indicator shaft 37 carrying the indicator needle 38. The shaft is supported in bearings 39 in wall 16.

The yoke 35 carries a rack 40 upon the interior of one side for engagement with a gear 41 carried by the shaft 37.

In order to insure proper ultimate curvature of the diaphragm 30 in each direction of movement I secure spheroidal discs 42 and 43 on opposite sides of the diaphragm.

In operation the pressure of the combined air and vapor in the pipe 11 and the lower part of the casing forces the diaphragm upwardly to a position varying with the pressure. As the plunger rises its rack rotates the gear 41 causing a corresponding rotation of the indicator needle 38. The scale can be calibrated to suit types or for particular locations of tank and conditions of service.

It will be obvious that my disclosure herein will suggest to those skilled in the art other ways in which a large part or all of the advantage of my invention may be secured without copying the forms shown and it is my intention to cover herein all such forms as come within the reasonable spirit and scope of my invention.

Having thus described my invention what I claim as new and desire to secure by Letters Patent is:—

1. In an indicator for showing the height of gasoline in a tank, the combination of, a casing having its bottom adapted for connection with a tank, a diaphragm across the casing, and having fluid tight connection at its edges with the casing, a plunger carried by the middle of the diaphragm and having a rack at an intermediate portion, a bearing for the opposite end of the plunger movable axially of the casing, means for axially adjusting the bearing, an abutment carried by said bearing, a spring bearing at one end against the abutment and at the other end against the diaphragm, a gear meshing with the rack, a shaft for the gear, bearings for the shaft and an indicator mounted upon the shaft.

2. In an indicator of the height of gasoline in a tank, the combination of a casing, adapted for connection with a tank, a flexible diaphragm at one end of the casing and having fluid tight connection at its edges with the casing, a plunger movable with the diaphragm, an axially adjustable guide for the plunger supported in the opposite end of the casing, a spring abutment upon the guide, a spring located between the abutment and diaphragm, a rack upon the plunger, a shaft transverse to the length of the rack, bearings for the shaft, a gear upon the shaft engaging the rack and an indicator upon the shaft.

3. In an indicator of the height of gasoline in a tank, the combination of a casing adapted for connection with a tank at one end, a diaphragm across the casing and having fluid tight connection at its edges with the casing, a plunger connected with the diaphragm, a spring and connections for pressing the diaphragm, a nut rotatable in the other end of the casing, a threaded abutment for one end of the spring supported by the nut, a shaft transverse to the direction of movement of the plunger, an indicator on the shaft and connections between the shaft and plunger whereby longitudinal movement of the plunger causes rotation of the shaft.

4. In a pressure indicator, a casing having a pressure opening, a diaphragm secured in fluid tight union across the casing adapted for movement axially of the casing, a plunger secured to the diaphragm, a sleeve extending axially of the casing passing through one end of it, threads on the outside of the sleeve, a nut rotatable in the casing and engaging the threads on the sleeve, means for stopping movement of the nut axially of the sleeve, a guide in the casing for the sleeve, an abutment adjustable with adjustment of the sleeve, a spring located between the abutment and the diaphragm, a rack on the plunger, a gear engaged by the rack, a shaft for said gear, passing through slots in the sleeve and an indicator needle carried by the shaft.

THOMAS M. EYNON.